(12) United States Patent
Hammarwall et al.

(10) Patent No.: US 9,059,758 B2
(45) Date of Patent: Jun. 16, 2015

(54) METHOD AND ARRANGEMENT IN A WIRELESS COMMUNICATION SYSTEM

(75) Inventors: David Hammarwall, Vallentuna (SE); Svante Bergman, Hägersten (SE); George Jöngren, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 23 days.

(21) Appl. No.: 13/876,072

(22) PCT Filed: Sep. 26, 2011

(86) PCT No.: PCT/SE2011/051144
§ 371 (c)(1),
(2), (4) Date: Mar. 26, 2013

(87) PCT Pub. No.: WO2012/044236
PCT Pub. Date: Apr. 5, 2012

(65) Prior Publication Data
US 2013/0195161 A1 Aug. 1, 2013

Related U.S. Application Data

(60) Provisional application No. 61/388,783, filed on Oct. 1, 2010.

(51) Int. Cl.
*H04B 7/04* (2006.01)
*H04B 7/06* (2006.01)
(52) U.S. Cl.
CPC ............ *H04B 7/0486* (2013.01); *H04B 7/0619* (2013.01); *H04B 7/063* (2013.01)
(58) Field of Classification Search
CPC .................................................. H04B 7/0619
See application file for complete search history.

(56) References Cited

U.S. PATENT DOCUMENTS

2007/0070928 A1* 3/2007 Sutivong et al. ............... 370/310
2009/0196366 A1* 8/2009 Shen et al. ..................... 375/260

(Continued)

OTHER PUBLICATIONS

Bai, Z. et al. "On the Physical Layer Performance with Rank Indicator Selection in LTE/LTE-Advanced System." 2010 IEEE 21st International Symposium on Personal, Indoor and Mobile Radio Communications Workshops (PIMRC Workshops), Sep. 26-30, 2010, pp. 393-398, Istanbul, Turkey.

*Primary Examiner* — Santiago Garcia
(74) *Attorney, Agent, or Firm* — Murphy, Bilak & Homiller, PLLC

(57) ABSTRACT

The invention relates to methods and arrangements for rank adaptation for transmissions over a multipie-input-muttipie-output, M1MO, channel in a wireless communications system. A receiving node (270) performs (310) measurements on reference signals received from a sending node (200), The receiving node performs (330a(330b) a first feedback computation for a first rank and at least one second feedback computation for at yeast one second rank based on the measurements. The first feedback computation includes applying a first relation between assumed transmitted energy for data and transmitted energy for the reference signals that is specific to the first rank. A second relation between assumed transmitted energy for data and transmitted energy for the reference signals is specific to the at least one second rank. The receiving node selects (340) one rank based on the feedback computations and indicates (350) the selected rank in a feedback report to the sending node.

46 Claims, 6 Drawing Sheets

(56) References Cited

U.S. PATENT DOCUMENTS

| | | | |
|---|---|---|---|
| 2010/0091905 A1* | 4/2010 | Khan | 375/296 |
| 2010/0272018 A1* | 10/2010 | Furueda et al. | 370/328 |
| 2010/0273514 A1* | 10/2010 | Koo et al. | 455/501 |
| 2011/0009148 A1* | 1/2011 | Kotecha | 455/513 |
| 2011/0075752 A1* | 3/2011 | Zheng et al. | 375/267 |
| 2011/0085537 A1* | 4/2011 | Tsai et al. | 370/342 |
| 2011/0201376 A1* | 8/2011 | Hu et al. | 455/522 |
| 2011/0255505 A1* | 10/2011 | Liu et al. | 370/330 |
| 2012/0020286 A1* | 1/2012 | Damnjanovic et al. | 370/328 |

* cited by examiner

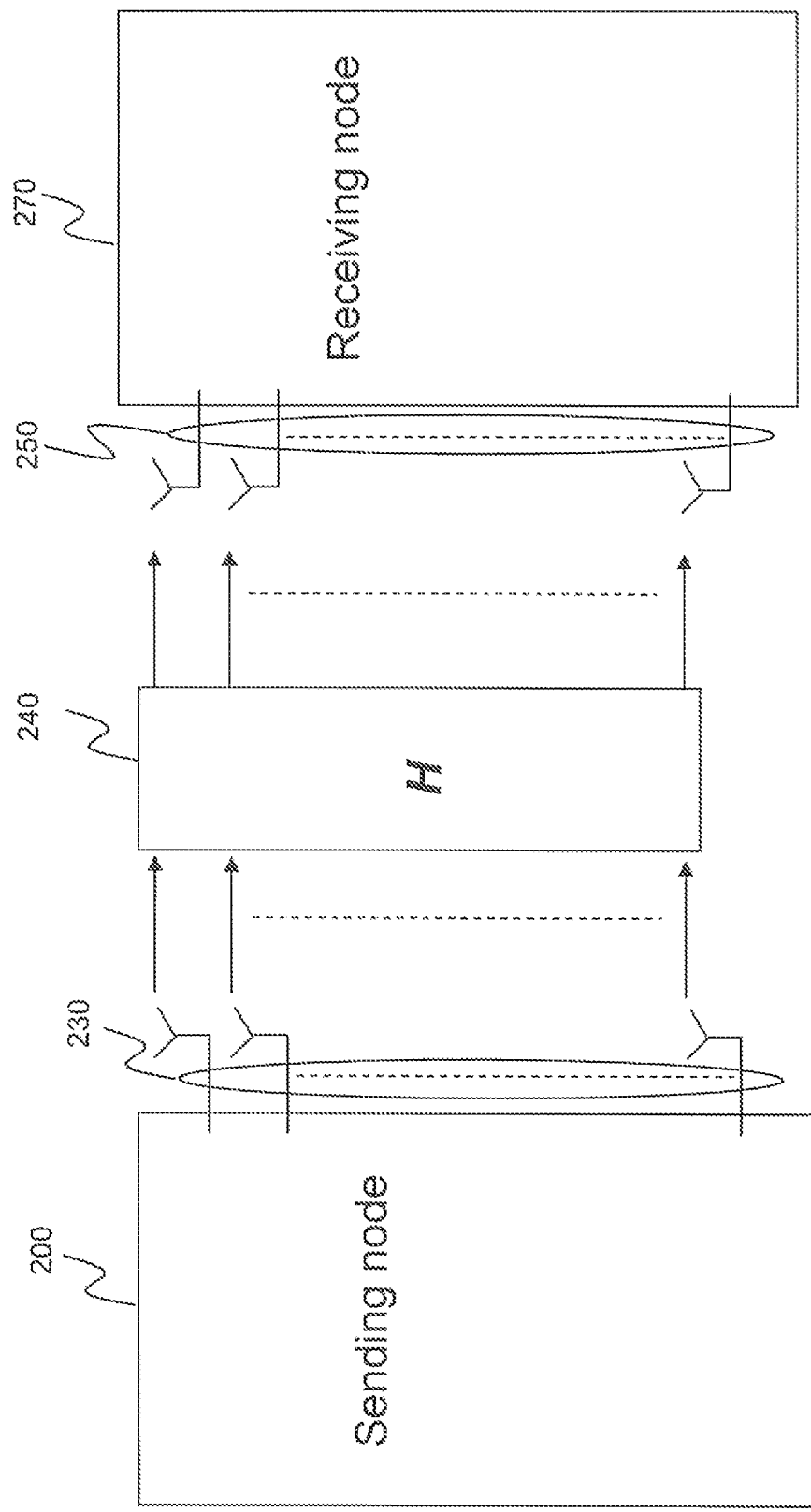

METHOD AND ARRANGEMENT IN A WIRELESS COMMUNICATION SYSTEM

TECHNICAL FIELD

The present disclosure relates generally to methods and arrangements in a wireless communications system. In particular it relates to transmission rank adaptation in a multiple antenna wireless communication system.

BACKGROUND

In a typical cellular radio communication system, also referred to as a wireless communication system, user equipments, also known as mobile terminals and/or wireless terminals communicate via a Radio Access Network (RAN) to one or more core networks. The user equipments may be mobile stations or user equipment units such as mobile telephones also known as "cellular" telephones, and laptops with wireless capability, e.g., mobile termination, and thus may be, for example, portable, pocket, hand-held, computer included, or car-mounted mobile devices which communicate voice and/or data with radio access network.

The radio access network covers a geographical area which is divided into cell areas, with each cell area being served by a base station, e.g., a Radio Base Station (RBS), which in some networks is also called "eNB", "eNodeB", "NodeB" or "B node" and which in this document also is referred to as a base station. A cell is a geographical area where radio coverage is provided by the radio base station equipment at a base station site. The base stations communicate over the air interface operating on radio frequencies with the user equipment units within the range of the base stations.

Multi-antenna techniques can significantly increase the data rates and reliability of a wireless communication system. The performance is in particular improved if both the transmitter or sending node and the receiver or receiving node are equipped with multiple antennas, which results in a multiple-input multiple-output (MIMO) communication channel. Such systems and/or related techniques are commonly referred to as MIMO.

The Long Term Evolution (LTE) standard is currently evolving with enhanced MIMO support. A core component in LTE is the support of MIMO antenna deployments and MIMO related techniques. LTE-Advanced, i e 3GPP Release-10, enables support of eight-layer spatial multiplexing with possible channel dependent precoding. Such spatial multiplexing is aimed for high data rates in favorable channel conditions. An illustration of preceded spatial multiplexing is provided in FIG. 1.

In preceded spatial multiplexing, the information carrying symbol vector s is multiplied by an $N_T \times r$ precoder matrix $W_{N_T \times r}$, which serves to distribute the transmit energy in a subspace of the $N_T$ dimensional vector space, which corresponds to $N_T$ antenna ports of the sending node. The r symbols in s each are part of a symbol stream, a so-called layer, and r is referred to as the rank or transmission rank. In this way, spatial multiplexing is achieved since multiple symbols can be transmitted simultaneously over the same time-frequency resource element (TFRE).

The number of layers or rank, r, is typically adapted to suit the current channel properties. Furthermore, the precoder matrix is often selected from a codebook of possible precoder matrices, and typically indicated by means of a precoder matrix indicator (PMI), which for a given rank specifies a unique precoder matrix in the codebook. If the precoder matrix is confined to have orthonormal columns, then the design of the codebook of precoder matrices corresponds to a Grassmannian subspace packing problem.

LTE uses Orthogonal Frequency Division Multiplexing (OFDM) in the downlink, and Discrete Fourier Transform (DFT) preceded OFDM in the uplink, and hence the received $N_R \times 1$ vector $y_n$ of data on the TFRE indexed n, is modeled by $$y_n = H_n W_{N_T \times r} s_n + e_n \quad (1)$$

where n denotes a transmission occasion in time and frequency, $e_n$ is a noise plus interference vector modeled as realizations of a random process. The precoder, or precoder matrix, for rank r, $W_{N_T \times r}$, can be a wideband precoder, which is either constant over frequency, or frequency selective.

The precoder matrix is often chosen to match the characteristics of the $N_R \times N_T$ MIMO channel matrix $H_n$, resulting in so-called channel dependent preceding. When based on User Equipment (UE) feedback, this is commonly referred to as closed-loop preceding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

In closed-loop precoding, the UE transmits, based on channel measurements in the forward link, i e the downlink, recommendations to the eNodeB or base station of a suitable precoder to use. A single precoder that is supposed to cover a large bandwidth, so called wideband precoding, may be fed back. It may also be beneficial to match the frequency variations of the channel and instead feed back a frequency-selective precoding report, e.g. several precoders, one per subband. This is an example of the more general case of channel state information (CSI) feedback, which also encompasses feeding back other entities or information than precoders to assist the eNodeB or base station in subsequent transmissions to the LIE. Such other information may include channel quality indicators (CQIs) as well as rank indicator (RI).

Signal and channel quality estimation is a fundamental part of a modern wireless system. Noise and interference estimates are used not only in the demodulator, but are also important quantities when estimating, for example, the channel quality indicator (CQI), which is typically used for link adaptation and scheduling decisions on the eNodeB or base station side.

The term $e_n$ in (1) represents noise and interference in a TFRE and is typically characterized in terms of second order statistics such as variance and correlation. The interference can be estimated in several ways, for example from cell-specific reference symbols (RS) that are present in the time-frequency grid of LTE. Such RS may correspond to the 3GPP Release-8 cell specific RS, transmitted on antenna ports 0-3, as well as the new CSI RS available in 3GPP Release -10.

Estimates or interference and noise can be formed in various ways. Estimates can easily be formed based on TFREs containing cell specific RS since $s_n$ and $W_{N_T \times r}$ are then known and $H_n$ is given by the channel estimator. It is further noted that the interference on TFREs with data, that is scheduled for the UE in question, also can be estimated as soon as the symbols, e g data symbols, $s_n$ are detected, as at that moment they can be regarded as known symbols. The latter interference can alternatively also be estimated based on second order statistics of the received signal and the signal $y_n$ intended for the UE of interest, thus possibly avoiding needing to decode the transmission before estimating the interference term.

Thus, in a wireless communication system employing multiple-input multiple-output (MIMO) communication where a transmitter or sending node, e g a base station or an eNodeB, having $N_T$ antenna ports transmits information carried in a symbol vector s comprising r symbols over a MIMO communication channel to a receiver or receiving node, e g a UE, having $N_R$ antenna ports, each of the r symbols in the information carrying symbol vector s is part of one of r symbol streams between the sending node and the receiving node, also called layers, and r is referred to as the rank or transmission rank. The number of layers or rank, r, is typically adapted to suit the current channel properties and a precoder matrix $W_{N_T \times r}$ for rank r is chosen. The precoder matrix may be chosen to match the characteristics of the $N_R \times N_T$ MIMO channel matrix $H_n$. In closed-loop precoding, the receiving node transmits, based on channel measurements in the forward link, i e the downlink, recommendations to the sending node of a suitable precoder matrix to use. In addition, the receiving node may need to estimate and report, for example, the channel quality indicator (CQI), which is typically used for link adaptation and scheduling decisions by the sending node.

In practice, CQIs are rarely perfect and substantial errors might be present which means that the estimated channel quality does not correspond to the actual channel quality seen for the link over which the transmission takes place. The eNodeB or base station can to some extent reduce the detrimental effects of erroneous CQI reporting by means of outer-loop adjustment of the CQI values. By monitoring the acknowledgement/non-acknowledgement (ACK/NACK) signaling of the hybrid automatic repeat request, (ARQ), the eNodeB or base station can detect if the block error rate (BLER), or a related measure, is below or above the target value. Using this information, the eNodeB or base station can decide to use more offensive, i a less robust, modulation and coding scheme (MCS) than recommended by the UE. Alternatively, the eNodeB can decide to use a more defensive, i a more robust, modulation and coding scheme (MCS) than recommended by the UE based on the information about BLER or a related measure. However, it is more difficult for the eNodeB or base station to deviate from recommended rank, because the CQI reports relate directly to the rank. A change in rank therefore renders the information provided by the CQI reports difficult or impossible to utilize—that is, the eNodeB or base station would have severe difficulties knowing which MCS to use on the different data streams if the eNodeB or base station would override the rank recommended by the UE.

SUMMARY

It is therefore an object of at least some embodiments of the present disclosure to improve the possibilities to perform transmission rank adaptation in a multiple-antenna wireless communications system.

It is a another object of at least some embodiments to enable a sending node to control or influence the considerations made and/or feedback given by a receiving node when assisting the sending node in performing adaptations of a rank for transmissions to the receiving node.

A further object of at least some embodiments is to enable a receiving node to provide feedback that balances performance aspects of the receiving node against overall system performance aspects when assisting the sending node in performing adaptations of the rank for transmissions to the receiving node.

According to a first embodiment of the present disclosure, at least some of these objects are achieved by a method in a receiving node for assisting a sending node in performing adaptations of a rank for transmissions. The transmissions are received by the receiving node over a multiple-input-multiple-output (MIMO) channel. The rank may be one out of a set of different ranks, and the set of different ranks comprises a first rank and at least one second rank. The receiving node performs measurements on one or more reference signals received from the sending node. The receiving node then performs a first feedback computation for the first rank based on the performed measurements. The first feedback computation includes applying a first relation between assumed transmitted energy for data and transmitted energy for the one or more reference signals. The first relation is specific to the first rank. A second relation between assumed transmitted energy for data and transmitted energy for the one or more reference signals is specific to the at least one second rank. The receiving node then performs at least one second feedback computation for the at least one second rank based on the performed measurements. Based on the performed first and at least one second feedback computations the receiving node then selects a rank out of the first rank and the at least one second rank and indicates the selected rank in a feedback report to the sending node.

According to a second embodiment of the present disclosure, at least some of these objects are achieved by a method in a sending node for enabling a receiving node to assist the sending node in performing adaptations of a rank for transmissions to the receiving node. The transmissions are made by the sending node over a multiple-input-multiple-output (MIMO) channel. The rank may be one out, of a set of different ranks, and the set of different ranks comprises a first rank and at least one second rank. The sending node transmits one or more reference signals to the receiving node. The sending node also signals a first relation between assumed transmitted energy for data and transmitted energy for the one or more reference signals to the receiving node and second relation between assumed transmitted energy for data and transmitted energy for the one or more reference signals. The first relation is specific to the first rank and the second relation is specific to the at least one second rank. The sending node then receives a feedback report from the receiving node. The feedback report indicates one of said first and said at least one second ranks as a selected rank.

According to a third embodiment of the present disclosure, at least some of these, objects are achieved by a receiving node for assisting a sending node in performing adaptations of a rank for transmissions. The transmissions are received by the receiving node over a multiple-input-multiple-output (MIMO) channel. The rank may be one out of a set of different ranks, and the set of different ranks comprises a first rank and at least one second rank. The receiving node comprises a transceiver and a processor. The transceiver is adapted to receive one or more reference signals from the sending node and to transmit a feedback report to the sending node. The processor is adapted to perform measurements on the one or more reference signals. The processor is further adapted to perform a first feedback computation for the first rank based on the performed measurements. The first feedback computation includes applying a first relation between assumed transmitted energy for data and transmitted energy for the one or more reference signals. The first relation is specific to the first rank. A second relation between assumed transmitted energy for data and transmitted energy for the one or more reference signals is specific to the at least one second rank. The processor is further adapted to perform at least one second feedback computation for the at least one second rank based on the performed measurements. Finally, the processor is adapted to select a rank out of the first rank and the at least one second rank based on the performed first and at least one second feedback computations and to indicate the selected rank in a feedback report to the sending node.

According to a fourth embodiment of the present disclosure, at least some of these objects are achieved by a sending node for enabling a receiving node to assist the sending node in performing adaptations of a rank for transmissions to the receiving node. The transmissions are made by the sending node over a multiple-input-multiple-output (MIMO) channel. The rank may be one out of a set of different ranks, and the set of different ranks comprises a first rank and at least one second rank. The sending node comprises a transceiver. The transceiver is adapted to transmit one or more reference signals to the receiving node. The transceiver is further adapted to signal a first relation between assumed transmitted energy for data and transmitted energy for the one or more reference signals and to signal a second relation between assumed transmitted energy for data and transmitted energy for the one or more reference signals to the receiving node. The first relation is specific to the first rank and the second relation is specific to the at least one second rank. Finally, the transceiver is adapted to receive a feedback report from the receiving node indicating one of said first and said at least one second ranks as a selected rank.

By providing a first relation between assumed transmitted energy for data and transmitted energy for the one or more reference signals that is specific to the first rank, and a second relation between assumed transmitted energy for data and transmitted energy for the one or more reference signals that is specific to the at least one second rank, and applying the first relation in the first feedback computation for the first rank, it becomes possible to apply different assumptions on relations between transmitted energy for data and transmitted energy for the one or more reference signals for different ranks or groups of ranks, thereby influencing the likelihood of different ranks to be selected or how often they are selected as a result of the feedback computations, as the relative candidate strengths among the ranks are altered.

The possibility to alter the relative candidate strengths among the ranks gives improved possibilities to perform transmission rank adaptation. The relations between assumed transmitted energy for data and transmitted energy for the one or more reference signals specific to a rank or to a group of ranks enable the sending node to control or influence the considerations made and/or feedback given by the receiving node so that the receiving node provides feedback that balances performance aspects of the receiving node against overall system performance aspects. Thus, the above objects are achieved by at least some embodiments of the present disclosure.

The introduction of several configurable PMO parameters or relations between assumed transmitted energy for data and transmitted energy for the one or more reference signals that may be different for different ranks has the advantage of offering a way for ensuring that the reported rank is increased, i e that a higher rank is reported, only when it is significantly beneficial from a link perspective to do so. This avoids the undesirable behavior that the receiving node or UE is reporting a higher rank because of a seemingly marginal gain on the link which turns into a loss because of the resulting higher ranks transmission's more detrimental interference to other cells. It also improves dynamic switching between SU-MIMO and MU-MIMO since the receiving node or UE, with appropriately configured PMO values or relations between assumed transmitted energy for data and transmitted energy for the one or more reference signals, is less likely to report a higher rank even though a lower, more MU-MIMO, friendly rank would turn out to be better.

BRIEF DESCRIPTION OF THE DRAWINGS

FIG. 2 is a schematic block diagram illustrating communication between a sending node and a receiving node according to some embodiments.

DETAILED DESCRIPTION

Figure 1:
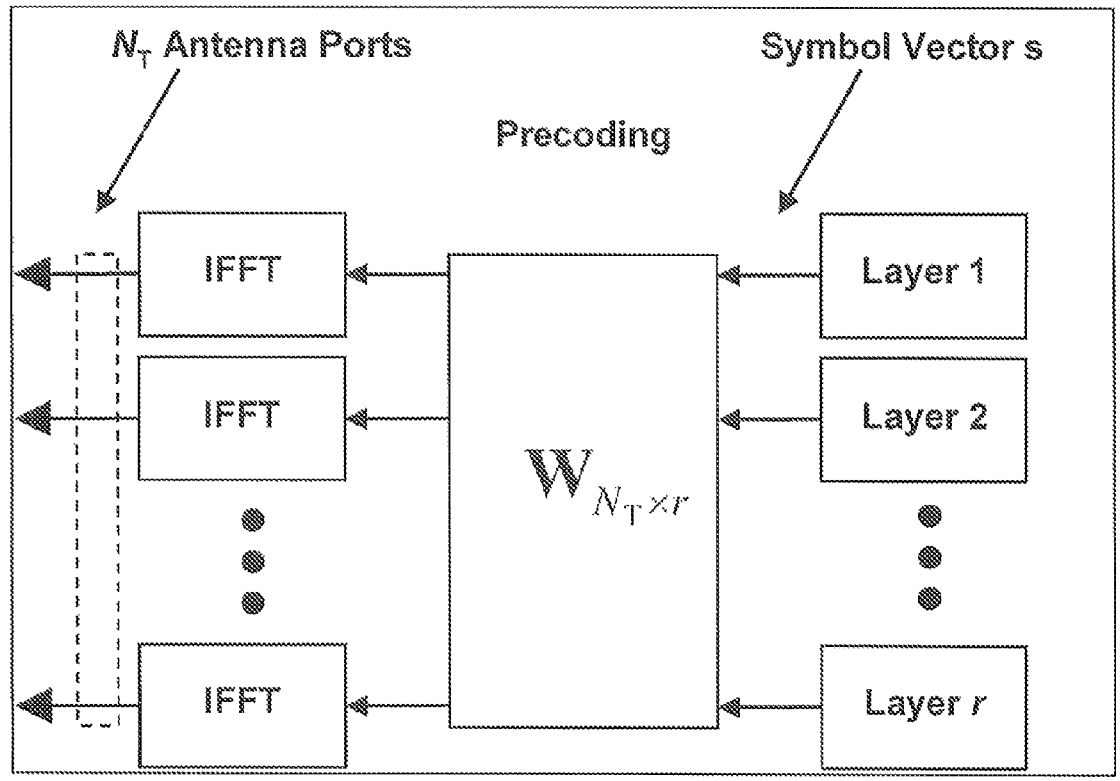
FIG. 1 schematic block diagram illustrating precoded spatial multiplexing.

In this section, the invention will be illustrated in more detail by some exemplary embodiments. It should be noted that these embodiments are not mutually exclusive Components from one embodiment may be tacitly assumed to be present in another embodiment and it will be understood by a person skilled in the art how those components may be used in the other exemplary embodiments.

It should be noted that although terminology from 3GPP LTE has been used in this disclosure to exemplify the invention, this should not be seen as limiting the scope of the invention to only the aforementioned system. Other wireless systems, including Wideband Code Division Multiple Access (WCDMA), Worldwide interoperability for Microwave Access (WiMax), Ultra Mobile Broadband (UMB) and Global System for Mobile Communications (GSM) systems, may also benefit from exploiting the ideas covered within this disclosure.

Further, terminology such as eNodeB and UE should be considered as non-limiting and does in particular not imply a certain hierarchical relation between the two; in general the term "eNodeB" or base station could be considered as a first device, first node or sending node and the term "UE" could be considered as a second device, second node or receiving node, and these two devices communicate with each other over a radio channel that may be of various types, for example a multiple-input-multiple-output, "MIMO" channel. Herein, we also focus on wireless transmissions in the downlink, i e from the eNodeB to the UE, but the teachings of the embodiments described herein are equally applicable in the uplink, i e from the UE to the eNodeB. Thus, in such embodiments the receiving node may be the eNodeB or base station and the sending node may be the UE.

According to at least some of the embodiments of the present disclosure, solutions for enabling a receiving node to assist a sending, node in performing rank adaptation in a multiple antenna wireless communication system are provided. A first node, also denoted a sending node, communicates with a second node, also denoted a receiving node, over a communication link over which one or more data streams or symbol streams may be sent between the sending node and the receiving node during a transmission occasion or time-frequency transmission occasion, where each number of data streams or symbol streams corresponds to one of a set of different transmission ranks.

The sending node and the receiving node are equipped with more than one or multiple antenna ports and/or more than one or multiple antennas, and communicate with each other over a multiple-input-multiple-output (MIMO) channel. The MIMO channel is set-up over a communication link over which one or more data streams or symbol streams may be sent in parallel between the sending node and the receiving node. Each number of data streams corresponds to one rank of a set of different ranks associated with the communication link. The receiving node performs measurements on reference signals transmitted by the sending node to estimate a measurement channel property and performs computations for feedback to the sending node for an assumed reception of a hypothetical data transmission of an assumed rank from the sending node based on the performed measurements. In the computations, the receiving node may use the measurement channel property, possibly modified by a scaling factor, as an assumed data channel property. The measurement channel property may be modified by the scaling factor to assume a better or worse data channel than indicated by the measurement channel property. Several such feedback computations may be performed, and for each feedback computation the assumed rank is selected from the set of different ranks. Based on the feedback computations one rank out of the set of different ranks is selected and the selected rank, or an indication RI of the selected rank, is reported in a feedback report to the sending node. The feedback report may be a Channel State Information (CSI) feedback report.

The inventors have realized that by allowing the scaling factor to be dependent on the assumed rank, so that the measurement channel property may be modified in different ways depending on which one of the ranks in the set of different ranks that is used as the assumed rank, it is possible to account for effects that are not directly seen by the receiving node and thereby enabling the receiving node to select a rank that better fulfills requirements from a sending node perspective and/or from an overall system perspective.

For example, in some situations the link level gain offered by multi-user MIMO (MU-MIMO) may be higher than the link level gain achieved if the receiving node selects a higher rank for single-user MIMO (SU-MIMO) operation instead of a lower rank SU-M MO. By designing the scaling factor so that the assumed data channel property indicates worse channel conditions of the data channel for the higher rank than for the lower rank, the lower rank may be reported, i e fed back to the sending node, even in high signal-to-noise ratio (SINR) conditions. This is beneficial for MU-MIMO, whereas for SU-MIMO in similar situations the use of the higher rank would typically be beneficial. The indication of worse channel conditions for the higher rank than for the lower rank may for example be achieved by the scaling factor scaling down the measurement channel property more when the assumed rank is the higher rank than when the assumed rank is the lower rank, or by the scaling factor scaling up the measurement channel property when the assumed rank is the lower rank and using the measurement channel property unmodified as the assumed data channel property for the higher rank.

The inventors have further realized that the suggested solution may improve the possibility to use MU-MIMO operation in a system such as an LTE system, where the UE is to a large extent unaware of co-scheduled UEs and thus reports feedback as if the UE would be scheduled alone on the time-frequency resources, i.e., single-user MIMO (SU-MIMO) operation is being assumed. On the other hand, the scheduler may very well wish to co-schedule multiple UEs on the time-frequency resources of interest, i.e., apply multi-user MIMO (MU-MIMO). For such scheduling to be efficient, the feedback information from the UEs needs to provide channel information that helps the scheduler in deciding between SU-MIMO and MU-MIMO or a combination thereof. However, for MU-MIMO it is beneficial if a low rank is being reported, i e fed back to the sending node even in high SINR conditions, while for SU-MIMO in similar situations the use of a high rank is typically beneficial. The feedback needs for SU-MIMO and MU-MIMO are therefore rather contradictory which might lead to a situation in which higher rank SU-MIMO is used even though it gives only a small link level gain over low rank SU-MIMO, a gain that is smaller than the gain offered by MU-MIMO if MU-MIMO would get a chance to be scheduled.

Another example of a situation when the solution suggested by the inventors may improve the selection of rank by the receiving node is when there is a risk that interference caused by high rank transmissions degrades system performance. As the interference caused by high rank transmissions is relatively spatially white and hence spread over more spatial directions, it is more difficult for to cancel interference stemming from higher rank transmissions than from lower rank transmissions. By designing the scaling factor so that the assumed data channel property indicates worse channel conditions of the data channel for higher ranks than for a lower rank, the lower rank, may be reported, i e fed back to the sending node and interference aspects may thus be taken into consideration when the receiving node selects a rank.

The rank feedback is otherwise performed in an opportunistic manner in the UE which selects rank to maximize its own performance without regard to how the choice of rank in the corresponding transmission will affect the interference to other UEs in, for example, the non-serving cells. It is well-known that UEs performing interference suppression has more difficulties suppressing interference stemming from higher rank than from lower rank transmissions. Hence, even though the UE might think that a higher rank is beneficial for its own performance, the increased interference from the choice of a higher rank might very well lead to lower system performance than if the UE would have selected another rank. More specifically, the interference caused by high rank transmissions is relatively spatially white and hence the interference is spread over more spatial directions. Such spread interference is also more difficult to cancel by advanced multiple-antenna UE receivers.

In existing solutions, the UE selects a certain rank and feeds it back to the eNodeB together with CQI and additional precoder information computed conditioned on the rank. The eNodeB processes the feedback and applies it for scheduling and link adaptation. Processing may include filtering as well as outer-loop ACK/NACK based adjustment of received CQIs to better correspond to the channel quality actually seen over the link after transmission. In practice, ACK/NACK based adjustment is non-trivial and it takes time for the outer-loop to converge. This property of the outer-loop adjustment may come into conflict with the choice of rank, which depends on instantaneous as well as long-term channel properties. Under some operating conditions, the rank that is fed back fluctuates wildly. Since the CQIs are computed conditioned on the rank, the characteristics of the CQIs fluctuate wildly as well. This causes problems for the outer-loop adjustment, which benefits from operating under stable conditions to have a chance to achieve decent convergence.

FIG. 2 illustrates a sending node 200 and a receiving node 270 that may be configured to implement the solutions and apply the methods proposed in the present disclosure. The sending node 200 is equipped with a number $N_T$ of antenna ports and/or antennas 230 and the receiving node 270 is equipped with a number $N_R$ of antenna ports and/or antennas 250. The sending node and the receiving node are configured to communicate over a communication link on a radio interface 240 on a multiple-input multiple-output (MIMO) communication channel using precoded spatial multiplexing. The sending node may transmit data to the receiving node in layered data transmissions of a rank r that may vary between one and the smallest number of antenna ports or antennas Min ($N_T$, $N_R$) of any one node, of the sending and receiving nodes. The rank r applied corresponds to a number of data streams or symbol streams sent between the sending node and the receiving node. For a rank of two or more, the data streams or symbol streams are parallel. The impact of the radio interface on the data transmissions may be modeled by a channel matrix H. The receiving node performs measurements on reference signals that are transmitted by the sending node on one or more of the $N_T$ antenna ports and/or antennas 230 and received by the receiving node on one or more of the $N_R$ antenna ports and/or antennas 250. The receiving node then may estimate a measurement channel property and perform computations for providing feedback regarding channel conditions to the sending node. In the computations, the receiving node may use the measurement channel property, possibly modified by a scaling factor, as an assumed data channel property. The modification of the measurement channel property by the scaling factor indirectly impacts a relative candidate strength of the assumed rank, which means that it impacts a likelihood that the assumed rank is selected as a result of the feedback computations. Several such feedback computations may be performed, and for each feedback computation the assumed rank is selected from the set of different ranks. Based on the feedback computations one rank out of the set of different ranks is selected and the selected rank, or an indication RI of the selected rank, is reported in a feedback report to the sending node. The sending node may then use the selected rank for transmissions to said receiving node.

According to one embodiment, a method in the receiving node for assisting the sending node in performing rank adaptation in a multiple antenna wireless communication system is provided, where the sending node communicates with the receiving node over a multiple-input-multiple-output, "MIMO" channel on a communication link over which a number of parallel data streams, including the special case of only one data stream, may be sent between the sending node and the receiving node. Each number of parallel data streams corresponds to one rank of a set of different ranks associated with the communication link. The set of different ranks comprises a first rank and at least one second rank. The receiving node performs measurements on one or more reference signals transmitted by the sending node. According to this embodiment, the receiving node then estimates a measurement channel property based on the performed measurements. The measurement channel property may in some embodiments be a measurement channel estimate.

The receiving node then performs a first and at least one second feedback computation based on the performed measurements for an assumed reception of a hypothetical data transmission of an assumed rank. The first rank and the at least one second rank are used as the assumed rank in the first and at least one second feedback computation respectively, and the estimated measurement channel property is in this embodiment modified by a scaling factor that is dependent on the assumed rank, so that a relative candidate strength of the assumed rank is modified. The relative candidate strength reflects a likelihood that the assumed rank is selected for being indicated or reported to the sending node for use in transmissions to said receiving node. Based on the performed feedback computations, the receiving node then determines a selected rank out of the first rank and the at least one second rank to be indicated or reported to the sending node. The receiving node then transmits the selected rank or an indication of the selected rank to the sending node in a feedback report.

The scaling factor may be modified by an hysteresis value so that, in a situation when the first rank is a current rank that has been indicated or reported to the sending node in a latest feedback report, the relative candidate strength of the assumed rank is higher when the first rank is used as the assumed rank as compared to the relative candidate strength of the assumed rank when the first rank is used as the assumed rank in a situation when the first rank is not the current rank.

In some embodiments, the scaling factor may control the candidate strength of the assumed rank by scaling a channel estimate obtained from the measurements on the reference signals differently for different assumed ranks in the above described rank computations or feedback computations, i e the channel estimate obtained from said reference signals may be used as the measurement channel property.

The scaling factor may in some embodiments reflect or control an assumption on transmitted energy for data relative to the transmitted energy for the reference signals thereby indirectly also controlling the candidate strength of each assumed rank selected from the set of different ranks. For example, the scaling factor may be set to a relation or quota or ratio between an assumed transmitted energy for data and the transmitted energy for the reference signal. Each such relation or quota or ratio may be specific to each rank, or to a group of ranks in the set of different ranks.

For example, a first relation between assumed transmitted energy for data and transmitted energy for one or more reference signals may be specific to the first rank and a second relation between assumed transmitted energy for data and transmitted energy for the one or more reference signals may be specific to the at least one second rank. To alter the relative candidate strengths between the first and the at least one second rank it is enough to apply the first relation in a first feedback computation where the first rank is assumed as long as different conditions, for example a default relation between assumed transmitted energy for data and transmitted energy for the one or more reference signals that does not discriminate different ranks, are assumed when performing feedback computations where the at least one second rank is assumed. However, applying the second relation between transmitted energy for data and transmitted energy for the one or more reference signals, that is specific to the at least one second rank, in feedback computations for the at least one second rank will contribute further to the possibilities to alter the relative candidate strengths among the ranks.

The scaling factor may be determined based on a set of scaling parameters. The scaling factor may be dependent on the assumed rank in that a first scaling parameter En said set of scaling parameters applies when using said first rank as the assumed transmission rank in the first feedback computation and a second scaling parameter in said set of scaling parameters applies when using the at least one second rank as the assumed rank in the at least one second feedback computation.

The scaling factor may be determined based on a set of scaling parameters. For example, the set of scaling parameters may be the set of quota or ratios between the assumed transmitted energy for data and the transmitted energy for the reference signal for the set of different ranks. The set of scaling parameters may take different values for different ranks. The values may be specific to each rank, or to each group of ranks. Alternatively or additionally, there may be one set of scaling parameters per rank or per group of ranks.

According to some embodiments, the set of scaling parameters may be a set of Power Measurement Offset, "PMO" parameters.

The scaling factor may in some embodiments be dependent on the assumed rank in that there is a specific scaling parameter in said set of scaling parameters that applies when using a specific one of the different ranks in said set of different ranks as the assumed rank in the feedback computations.

The scaling factor and/or scaling parameters may be pre-configured and available in the receiving node according to some embodiments. Alternatively or additionally, the scaling factor and/or scaling parameters may be signalled by the sending node, for example in a control message, to the receiving node. The signalling may be done semi-dynamically or dynamically, e g when requested or at regular intervals.

In an example, the previously mentioned problems of prior solutions may be mitigated by stabilizing the rank reporting or feedback reporting of selected rank and, introducing means for the sending node or eNodeB to control the degree of relative aggressiveness among ranks, i e how often the different ranks are selected by the receiving node, by setting power measurement offsets (PMOs) to be used in the feedback reporting.

Controlling relative aggressiveness of ranks or candidate strength may be achieved by introducing different PMO parameters for different ranks, in some embodiments preferably rank specific PMO parameters. The PMO parameters may in some embodiments be configured by the sending node or eNodeB. In the evaluation of each rank or transmission rank, the receiving node or UE may then for each rank apply the associated PMO parameters. In some embodiments it may be beneficial if separate PMO parameter settings could be applied to the rank selection and CQI/precoder computation.

It should however be noted that the sending node or eNodeB, knowing actual as well as signaled relation or ratio between the actual or assumed transmitted energy for data and the transmitted energy for reference signals is capable of adjusting CQI values.

Note that in the context of this disclosure, rank specific PMO parameters means that the PMO parameters may be different for different transmission ranks. This does not mean that the PMO parameters necessarily are different for each rank, but some ranks may be grouped to use the same PMO parameters.

Transmission rank reporting or feedback reporting of rank may be further stabilized by adding hysteresis to rank selection so that a selected rank is kept for a longer time and not abandoned because of small, possibly insignificant changes of the channel properties. Hysteresis can be achieved by ensuring that when a new rank has been selected, PMO parameter values for other possible ranks may be decreased by a hysteresis value compared with configured values, and/or the PMO parameter value of the currently selected rank may be increased by the hysteresis value. The hysteresis values are applied when the receiving node performs the next feedback computations after having reported the new rank as selected rank in a feedback report. The new rank is then taken to be or regarded as a current rank. The current rank is thereby the rank that was reported in the latest feedback report.

The hysteresis value may be preconfigured and available in the receiving node according to some embodiments. Alternatively or additionally, the hysteresis value may be signalled by the sending node, for example in a control message, to the receiving node. The signalling may be done semi-dynamically or dynamically, e g when requested or at regular intervals. Different hysteresis values may be applied for different ranks being selected as the current rank.

Rank Specific Power Measurement Offsets (PMOs)

As mentioned previously, a model of the received data vector on TFREs carrying data symbols can be written as $$y = H W_{n_{TX}} s + e \quad (2)$$

where we now for notational simplicity have omitted the subscript n. For feedback computations, the receiving node or UE needs to assume a similar model for the reception of a hypothetical transmission, or for an assumed reception of a hypothetical data transmission. However, the model does not necessarily need to be exactly the same. The receiving node or UE estimates the channel matrix based on reference signals, e.g., Release-8 cell specific reference signal (RS) or Release-10 Channel State Information Reference Signal (CSI RS), producing a measurement channel matrix $H_m$. This channel is scaled by a rank specific or group of rank specific scaling factor or PMO factor $\alpha_r$ to produce a model for the data channel matrix H, which in turn is used to form a measurement model for feedback determination as $$y = \alpha_r H_m W_{n_{TX}} s + e \quad (3)$$

Note again that $\alpha_r$ is not necessarily independently configurable, for example some ranks may be grouped to use the same scaling factor or PMO parameter configuration.

A scaling factor or PMO factor can take on many equivalent forms, including be specified in dB or linear scale, re-parameterized as a power offset instead of a scaling factor, scaling the e term instead of the channel term in expression (3) etc.

The measurement model with the rank specific scaling of the channel matrix part is used by the receiving node or UE for selecting which rank to report. The same model may also be used for precoder and/or CQI determination but those feedback components may use potentially different scaling factors in order to minimize the side effects of adjusting the aggressiveness of rank adaptation, meaning that the frequency of selecting a higher or lower rank is adjusted by adjusting the strength as a candidate of different ranks. Selecting higher ranks more often is more aggressive than selecting lower ranks more often.

The scaling factor may be configured by the sending node or eNodeB. The sending node or eNodeB may thus send a configuration message to the receiving node or UE from which the scaling factor may be determined. Such configuration may be performed in semi-static manner using e.g. higher layer signaling such as RRC och MAC element but it may also be implemented in a more dynamic manner in which the scaling factor may be modified as part of a dynamic triggering mechanism of the receiving node or UE feedback to the sending node.

The scaling factor can be viewed as "fooling" the receiving node or UE into believing that the SINR or other channel property or characteristic is better, or worse, than what it actually is. Since the proper rank or selected rank increases with increasing SINR or other channel property or characteristic, the rank reporting or feedback reporting can be made, more aggressive, i e so that a higher rank is selected more often, by increasing the scaling factor, and conversely, be made more defensive, i e so that a lower rank is selected more often, with decreased scaling factors. By setting the scaling factor individually for the different ranks, the likelihood of a rank relative the other ranks may be altered. For example, decreasing the scaling factor with increasing rank, i.e., $$\alpha_1 > \alpha_2 > \ldots > \alpha_{r_{max}} \quad (4)$$

may be used to make higher rank transmissions less likely. By decreasing the scaling factor sufficiently much for a higher rank, it is possible to ensure that a higher rank transmission is only applied when it is substantially better than a lower rank transmission. This avoids today's situation where a higher rank is chosen even though the performance gain on link level is marginal and risks becoming negative on a system level where the detrimental impact of higher rank interference are seen.

A typical situation would correspond to a UE or receiving node with two receive antennas and hence the maximum rank is two. PMO value or scaling factor for rank would be set a couple of dBs higher than for rank 2. The exact difference of PMO values or scaling factors can be established a-priori through empirical studies of real or simulated systems. Different kinds of scenarios are conceivable, including pure SU-MIMO, and MU-MIMO with dynamic switching to SU-MIMO.

The invented mechanism may also be used as a mean or tool for the sending node or eNodeB to perform rank override of the UE or receiving node feedback reporting. By setting a very high PMO value or scaling factor for a certain rank, the receiving node or UE can be made to always report only that rank.

Stabilized Rank Adaptation by Means of Hysteresis

Stabilized rank adaptation may be achieved by adding hysteresis to the rank selection. Such hysteresis may be enabled by modifying the rank specific PMOs or scaling factors mentioned above so that when a new rank is selected, the PMO values or scaling factors for other possible ranks are decreased compared with configured values or configured scaling factors. This will favor the current rank and require larger change in channel properties in order for the rank to change. In other words, if the receiving node or UE is reporting rank r, subsequent selection of rank in the receiving node or UE is based on PMO values or scaling factors $$\alpha_1, \ldots, \alpha_{r-1}, \alpha_r + \Delta, \alpha_{r+1} \ldots, \alpha_{N_T} \quad (5)$$

where $\Delta$ is a parameter that may be set to a hysteresis value and that controls the amount of hysteresis. Alternatively or additionally, the hysteresis parameter or hysteresis value may be subtracted from PMO values or scaling factors of the other ranks, i.e., $$\alpha_1 - \Delta, \ldots, \alpha_{r-1} - \Delta, \alpha_r, \alpha_{r+1} - \Delta \ldots, \alpha_{N_T} - \Delta \quad (6)$$

The latter form shown in (6) may have the advantage that the CQIs and precoder selection computations are not affected by the hysteresis parameter or hysteresis value, thus minimizing unwanted side effects of changing PMO values or scaling factors. The amount of hysteresis may be controlled by the sending node or eNodeB which can signal to the receiving node or UE the value of the hysteresis parameter $\Delta$. Also in this case the type of signaling may be either semi-static or dynamic in a similar manner as described for the scaling factors or PMO parameters.

The method in the receiving node 270 for assisting a sending node 200 in performing adaptations of a rank for transmissions to the receiving node 270 over a multiple-input-multiple-output (MIMO) channel according to some embodiments will now be described with reference to FIG. 3*a*. The transmissions, for example data transmissions, are received by the receiving node 270 over the MHO channel. The rank used for the transmissions may be one out of a set of different ranks. The set of different ranks comprises a first rank and at least one second rank. The transmissions may for example be transmissions of data. The method comprises the following steps, which may be taken in any appropriate order;

310. The receiving node 270 performs measurements on one or more reference signals received from the sending node 200.

330*a*. The receiving node 270 performs a first feedback computation for the first rank based on the performed measurements. The first feedback computation includes applying a first relation between assumed transmitted energy for data and transmitted energy for the one or more reference signals. The first relation reflects an assumption on transmitted energy for data if data would be received that had been transmitted using the first rank relative to the transmitted energy for the one or more reference signals, for example in form of a ratio between the assumed transmitted energy for data for the first rank and transmitted energy for the one or more reference signals.

Applying the first relation between assumed transmitted energy for data and transmitted energy for the one or more reference signals in the first feedback computation adjusts how often the first rank becomes the selected rank. In an example embodiment, when the first rank is a lower rank than the at least one second rank, applying the first relation between assumed transmitted energy for data and transmitted energy for the one or more reference signals in the first feedback computation may increase a likelihood that the first rank becomes the selected rank.

The first relation is specific to the first rank in that it has been specifically or individually configured for the first rank. A second relation between assumed transmitted energy for data and transmitted energy for the one or more reference signals is specific to the at least one second rank in that it has been specifically or individually configured for the at least one second rank. This also means that the first relation has not been configured for the at least one second rank.

The first and second relations between assumed transmitted energy for data and transmitted energy for the one or more reference signals may be received from the sending node 200, for example in one or more configuration messages or control messages. Alternatively or additionally, the first and second relations between assumed transmitted energy for data and transmitted energy for the one or more reference signals may be pre-configured in the receiving node 270.

The first relation between assumed transmitted energy for data and transmitted energy for the one or more reference signals may be reflected by a first Power Measurement Offset parameter applicable for or specific to the first rank. The second relation between assumed transmitted energy for data and transmitted energy for the one or more reference signals may be reflected by a second Power Measurement Offset parameter applicable for or specific to the at least one seqond rank. In some embodiments, the first and second relation between assumed transmitted energy for data and transmitted energy for the one or more reference signals are equivalent to the first and second Power Measurement Offset parameters. The first and second Power Measurement Offset parameters, or first and second relations between assumed transmitted energy for data and transmitted energy for the one or more reference signals, may further in some embodiments be separate from Power Measurement Offset parameters used for precoder and/or Channel Quality Indicator determination.

330*b*. The receiving node 270 performs at least one second feedback computation for the at least one second rank based on the performed measurements.

The at least one, second feedback computation for the at least one second rank may in some embodiments include applying the second relation between assumed transmitted energy for data and transmitted energy for the one or more reference signals, whereas in other embodiments the at least one second feedback computation may be performed assuming conditions that are not dependent on rank. The second relation reflects an assumption on transmitted energy for data if data would be received that had been transmitted using one of the at least one second rank relative to the transmitted energy for the one or more reference signals, for example in form of a ratio between the assumed transmitted energy for data for the at least one second rank and transmitted energy for the one or more reference signals.

Applying the second relation between assumed transmitted energy for data and transmitted energy for the one or more reference signals in the at least one second feedback computation may in some embodiments further adjust, in addition to the adjustment obtained by applying the first relation in the first feedback computations, how often the first rank becomes the selected rank. In an example embodiment, when the first rank is a lower rank than the at least one second rank, applying the second relation between assumed transmitted energy for data and transmitted energy for the one or more reference signals in the at least one second feedback computation may further increase, in addition to the increase obtained by applying the first relation in the first feedback computations, the likelihood that the first rank becomes the selected rank.

340. The receiving node 270 selects a rank out of the first rank and the at least one second rank based on the performed first and at least one second feedback computations.

350. The receiving node 270 indicates the selected rank to the sending node 200. The receiving node 270 sends or transmits the indication of the selected rank in a feedback report to the sending node 200. The selected rank may for example be indicated by a Rank Indicator (RI) in a Channel State Information (CSI) feedback report.

According to some embodiments, the first relation between assumed transmitted energy for data and transmitted energy for the one or more reference signals may be modified by a hysteresis value when the first rank is indicated to the sending node 200 in a latest feedback report, so that the relative candidate strength of the first rank becomes higher when the first rank was indicated to the sending node 200 in the latest feedback report, as compared to the relative candidate strength of the first rank when the first rank was not indicated to the sending node 200 in the latest feedback report.

Figure 3A:
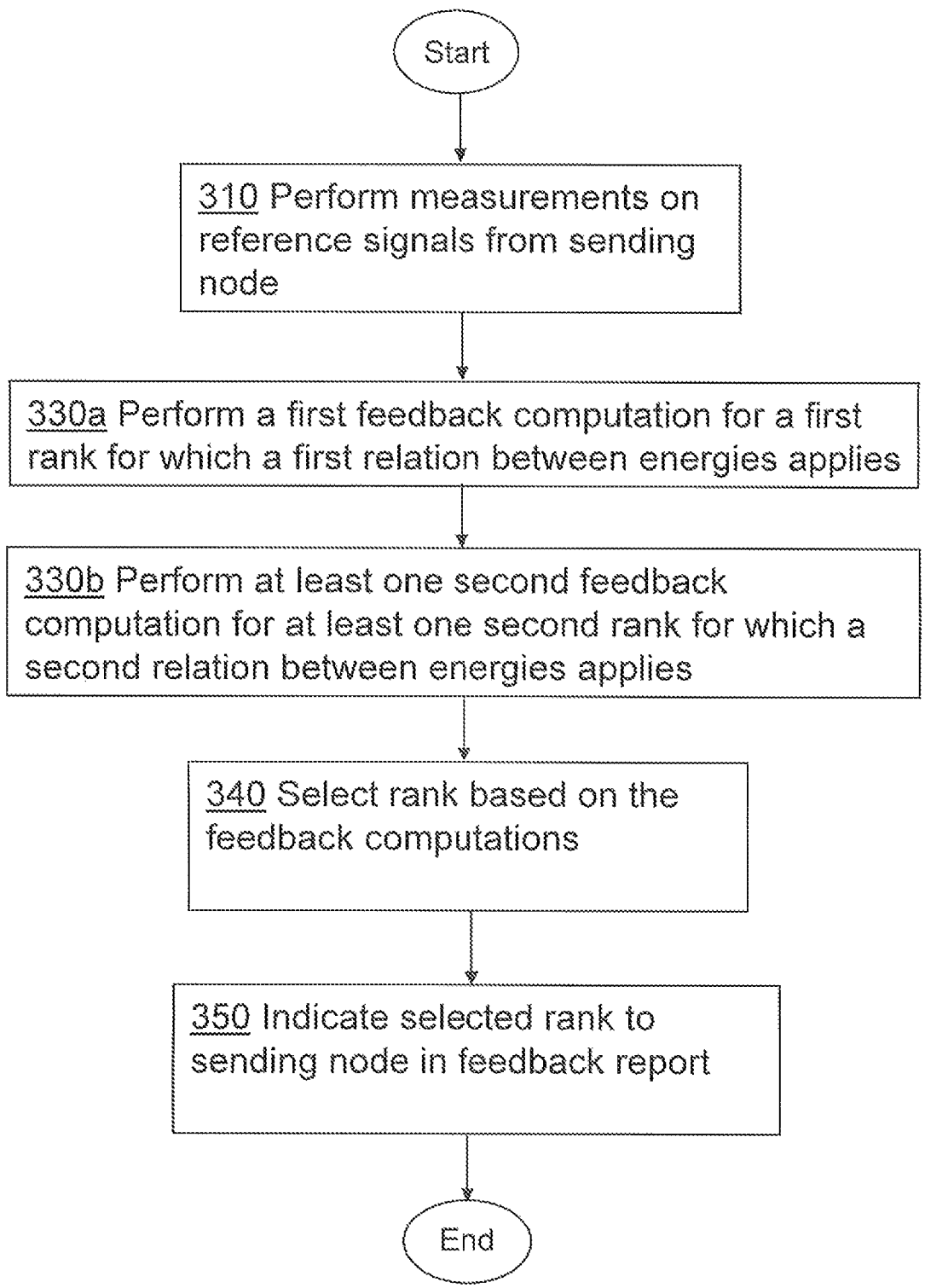
FIG. 3a is a flow chart illustrating a method in a receiving node according to some embodiments.
Figure 3B:
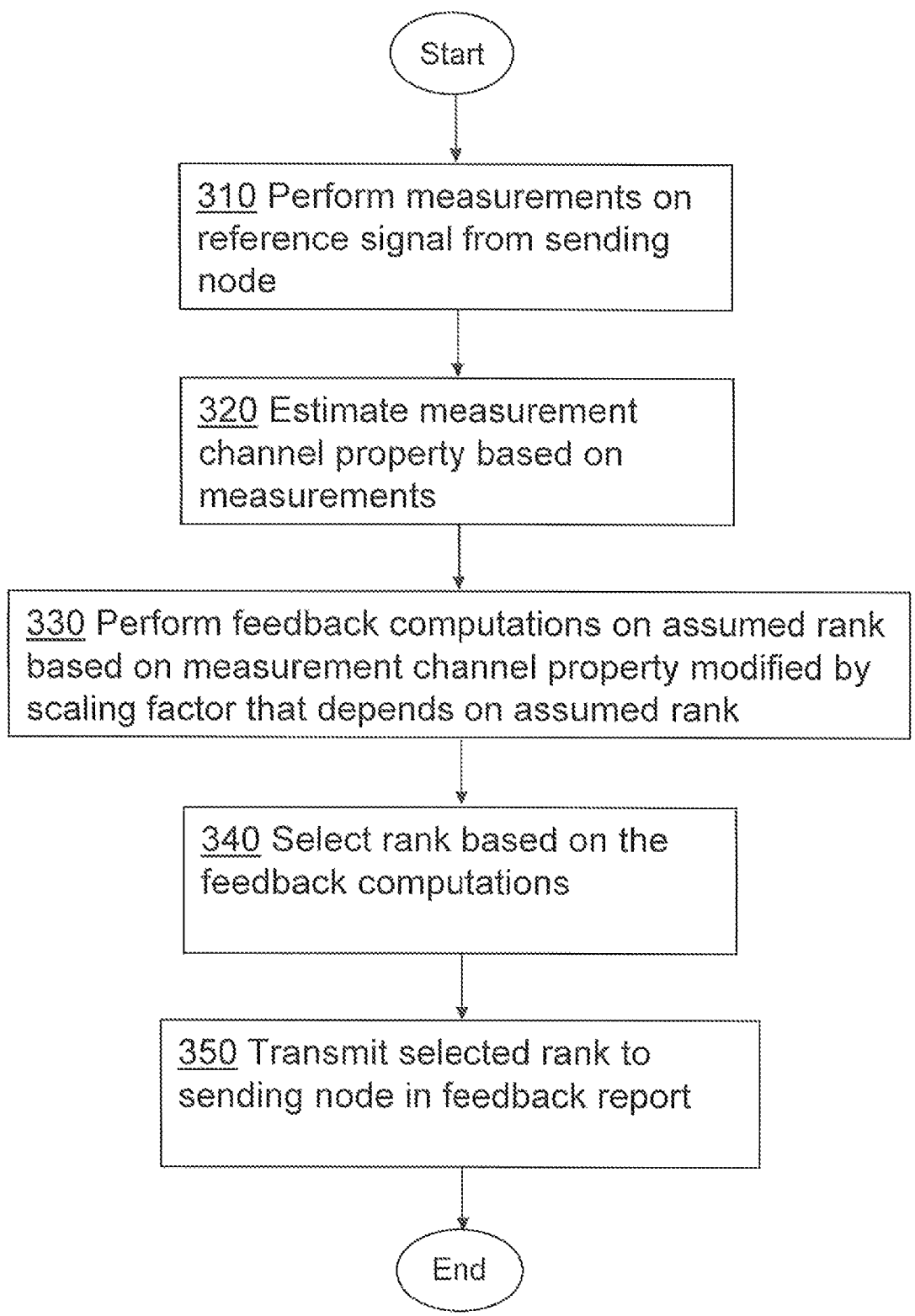
FIG. 3b is a flow chart illustrating a method in e receiving node according to some embodiments.

FIG. 3b illustrates further embodiments where the first relation between assumed transmitted energy for data and transmitted energy for the one or more reference signals is reflected by a first scaling parameter applicable for or specific to the first rank and wherein the second relation between assumed transmitted energy for data and transmitted energy for the one or more reference signals is reflected by a second scaling parameter applicable for or specific to the at least one second rank. In other words, the first scaling parameter may be determined from the first relation between assumed transmitted energy for data and transmitted energy for the one or more reference signals and the second scaling parameter may be determined from the second relation between assumed transmitted energy for data and transmitted energy for the one or more reference signals. The first and second relations between assumed transmitted energy for data and transmitted energy for the one or more reference signals may be received from the sending node 200. Alternatively, the first and second scaling parameters may be received from the sending node 200, for example in one or more configuration messages or control messages. The first and second scaling parameters may also be pre-configured in the receiving node 270. In some embodiments, the first and second scaling parameters may be comprised in a set of Power Measurement Offset (PMO) parameters, Additionally or alternatively, the first and second scaling parameters may be separate from Power Measurement Offset parameters used for precoder and/or Channel Quality Indicator determination.

The present method steps in the receiving node 270 for assisting the sending node in performing rank adaptation, i e adaptations of a rank, for transmissions to the receiving node 270 over a multiple-input-multiple-output (MIMO) channel in a multiple antenna wireless communication system according to these further embodiments will now be described with reference to a flow chart depicted in FIG. 3b. Again in these embodiments, the transmissions are received by the receiving node 270 over the MIMO channel. The rank used for the transmissions may be one out of a set of different ranks. The set of different ranks comprises a first rank and at least one second rank. The transmissions may for example be transmissions of data. The method comprises the following steps, which may be taken in any appropriate order:

310. The receiving node 270 performs measurements on one or more reference signals received from the sending node 200.

320. The receiving node 270 estimates a measurement channel property based on the performed measurements. The measurement channel property may in some embodiments be a measurement channel estimate.

330. The receiving node 270 performs feedback computations for assumed rank based on the measurement channel property modified by a scaling factor that is determined based on a set of scaling parameters that comprises the first and second scaling parameters. The scaling factor depends on the assumed rank in that the first scaling parameter applies when using said first rank as the assumed rank and the second scaling parameter applies when using the at least one second rank as the assumed rank. Thus, in a first feedback computation performed for the first rank, i e where the first rank is assumed, the measurement channel property is modified by the first scaling parameter that is specific to the first rank in that it has been specifically or individually configured for the first rank. In at least one second feedback computation performed for the at least one second rank, i e where the at least one second rank is assumed, the measurement channel property may additionally be modified by the second scaling parameter that is specific to the at least one second rank in that it has been specifically or individually configured for the at least one second rank.

The first and second feedback computations are performed to determine relative candidate strengths of the first rank and the at least one second rank. By applying the first scaling parameter in the first feedback computation and/or the second scaling parameter in the at least one second feedback computation, the relative candidate strengths of the first and at least one second rank may be modified, i e the strengths as a candidate for use in transmissions to the receiving node 270 of the first and at least one second rank are modified relative to each other.

340. The receiving node 270 selects a rank out of the first rank and the at least one second rank based on the performed first and at least one second feedback computations. The selection may be performed based on the relative candidate strengths determined in the performed first and at least one second feedback computations.

350. The receiving node 270 transmits the selected rank to the sending node 200 in a feedback report. The selected rank may for example be indicated by a Rank Indicator (RI) in a Channel State Information (CSI) feedback report.

According to some embodiments, the first scaling parameter may be modified by a hysteresis value when the first rank is indicated to the sending node 200 in a latest feedback report, so that the relative candidate strength of the first rank becomes higher when the first rank was indicated to the sending node 200 in the latest feedback report, as compared to the relative candidate strength of the first rank when the first rank was not indicated to the sending node 200 in the latest feedback report.

Figure 3C:
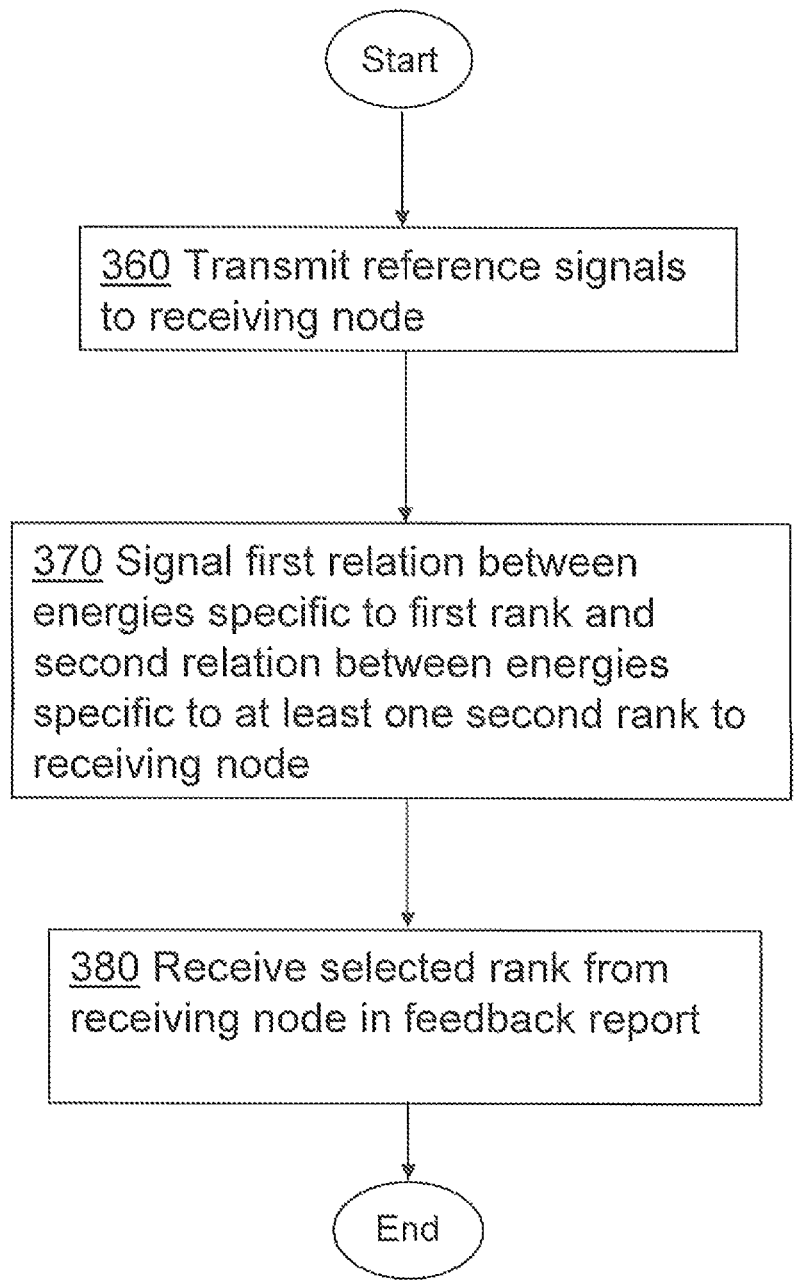
FIG. 3c is a flow chart illustrating a method in a sending node according to some embodiments.

The method in the sending node 200 for enabling the receiving node 270 to assist the sending node 200 in performing adaptations of a rank for transmissions to the receiving node 270 over a multiple-input-multiple-output (MIMO) channel according to another embodiment will now be described with reference to FIG. 3c. The rank used for the transmissions to the receiving node 270 may be one out of a set of different ranks. The set of different ranks comprises a first rank and at least one second rank. The transmissions may for example be transmissions of data. The method comprises the following steps, which may be taken in any appropriate order: for example, step 370 may be performed prior to step 360:

360. The sending node 200 transmits one more reference signals to the receiving node 270.
370. The sending node 200 signals or transmits to the receiving node 270 a first relation between assumed transmitted energy for data and transmitted energy for the one or more reference signals, wherein the first relation is specific to the first rank, and a second relation between assumed transmitted energy for data and transmitted energy for the one or more reference signals, wherein the second relation is specific to the at least one second rank. The first relation is specific to the first rank in that it has been specifically or individually configured for the first rank. The second relation is specific to the at least one second rank in that it has been specifically or individually configured for the at least one second rank. This also means that the first relation has not been configured for the at least one second rank.

The first relation between assumed transmitted energy for data and transmitted energy for the one or more reference signals may be reflected by a first Power Measurement Offset parameter applicable for or specific to the first rank. The second relation between assumed transmitted energy for data and transmitted energy for the one or more reference signals may be reflected by a second Power Measurement Offset parameter applicable for or specific to the at least one second rank. In some embodiments, the first and second relation between assumed transmitted energy for data and transmitted energy for the one, or more reference signals are equivalent to the first and second Power Measurement Offset parameters. The first and second Power Measurement Offset parameters, or first and second relations between assumed transmitted energy for data and transmitted energy for the one or more reference signals, may further in some embodiments be separate from Power Measurement Offset parameters used for precoder and/or Channel Quality Indicator determination.

380. The sending node 200 receives a feedback report from the receiving node 270 indicating one of said first and said at least one second ranks as a selected rank. The sending node 200 may then use the selected rank for transmissions to the receiving node 270. The sending node 200 may however in other embodiments override the selection of rank made by the receiving node and use another rank for transmissions to the receiving node 270.

The first relation between assumed transmitted enemy for data and transmitted energy for the one or more reference signals may be set so that the likelihood that the first rank is reported as the selected rank by the receiving node 270 is adjusted. For example, the first relation between assumed transmitted energy for data and transmitted energy for the one or more reference signals may be set so that the likelihood that the first rank is reported as the selected rank by the receiving node 270 is increased when the first rank is a lower rank than the at least one second rank. Similarly, the second relation between assumed transmitted energy for data and transmitted energy for the one or more reference signals may be set so that the likelihood that one of the at least one second rank is reported as the selected rank by the receiving node 270 is adjusted.

Figure 4:
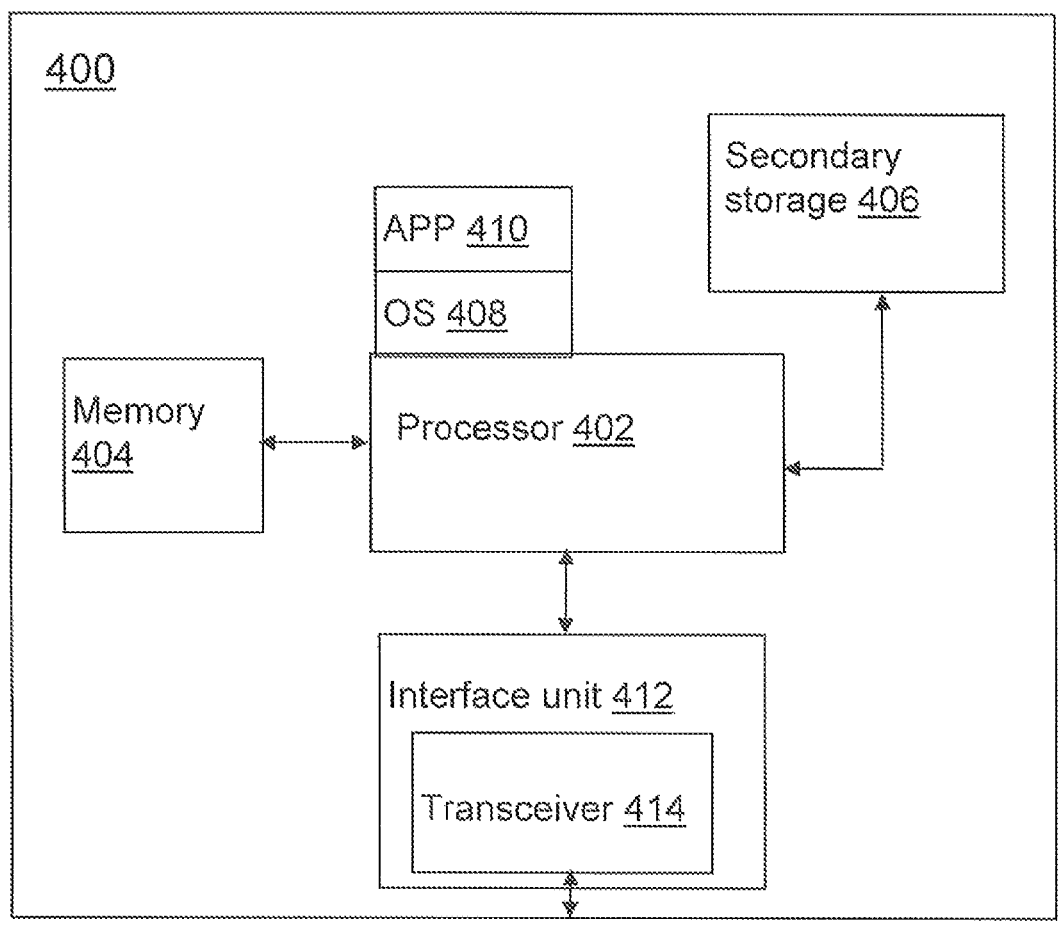
FIG. 4 is a schematic block diagram illustrating ara arrangement according to some embodiments.

To perform the method steps for assisting a sending node 200 in performing transmission rank adaptation, i e adaptations of a rank for transmissions, the receiving node 270 may be implemented as a node 400 depicted in FIG. 4. As mentioned above, the transmissions, for example data transmissions, are received by the receiving node 270, 400 over the MIMO channel. The rank used for the transmissions may be one out of a set of different ranks. The set of different ranks comprises a first rank and at least one second rank. The transmissions may for example be transmissions of data.

The receiving node 270, 400 comprises a processor 402 upon which an Operating System 408 and an application 410 may run. The processor 402 is adapted to control an interface unit 412 that comprises a transceiver 414. The processor 402 may further be adapted to control a memory 404 and a secondary storage 406 that may be comprised in the receiving node 270, 400.

In accordance with embodiments of the method presented with reference to FIG. 3a, the transceiver 414 is adapted to receive one or more reference signals from the sending node 200 and to transmit or send a feedback report to the sending node 200.

The transceiver 414 may further be adapted in some embodiments to receive first and second relations between assumed transmitted energy for data and transmitted energy for the one or more reference signals from the sending node 200, for example in one or more configuration messages or control messages. Alternatively or additionally, the first and second relations between assumed transmitted energy for data and transmitted energy for the one or more reference signals may be pre-configured in the receiving node 270, 400, for example in memory 404.

In accordance with embodiments of the method presented with reference to FIG. 3a, the processor 402 is adapted to perform measurements on the one or more reference signals. The processor 402 is further adapted to perform a first feedback computation for the first rank based on the performed measurements. In the first feedback computation the processor 402 is adapted to include applying the first relation between assumed transmitted energy for data and transmitted energy for the one or more reference signals. The first relation reflects an assumption on transmitted energy for data if data would be received that had been transmitted using the first rank relative to the transmitted energy for the one or more reference signals, for example in form of a ratio between the assumed transmitted energy for data for the first rank and transmitted energy for the one or more reference signals.

Applying the first relation between assumed transmitted energy for data and transmitted energy for the one or more reference signals in the first feedback computation adjusts how often the first rank becomes the selected rank. In an example embodiment, when the first rank is a lower rank than the at least one second rank, applying the first relation between assumed transmitted energy for data and transmitted energy for the one or more reference signals in the first feedback computation may increase a likelihood that the first rank becomes the selected rank. According to some embodiments, the first relation between assumed transmitted energy for data and transmitted energy for the one or more reference signals, being specific to the first rank, may be modified by a hysteresis value when the first rank is indicated to the sending node 200 in a latest feedback report, so that the relative candidate strength of the first rank becomes higher when the first rank was indicated to the sending node 200 in the latest feedback report, as compared to the relative candidate strength of the first rank when the first rank was not indicated to the sending node 200 in the latest feedback report.

The first relation is specific to the first rank in that it has been specifically or individually configured for the first rank. The second relation between assumed transmitted energy for data and transmitted energy for the one or more reference signals is specific to the at least one second rank in that it has been specifically or individually configured for the at least one second rank. This also means that the first relation has not been configured for the at least one second rank.

The first relation between assumed transmitted energy for data and transmitted energy for the one or more reference signals may be reflected by a first Power Measurement Offset parameter applicable for or specific to the first rank. The second relation between assumed transmitted energy for data and, transmitted energy for the one or more reference signals may be reflected by a second Power Measurement Offset parameter applicable for or specific to the at least one second rank. In some embodiments, the first and second relation between assumed transmitted energy for data and transmitted energy for the one or more reference signals are equivalent to the first and second Power Measurement Offset parameters. The first and second Power Measurement Offset parameters, or first and second relations between assumed transmitted energy for data and transmitted energy for the one or more reference signals, may further in some embodiments be separate from Power Measurement Offset parameters used for precoder and/or Channel Quality Indicator determination.

Additionally, the processor 402 is adapted to perform at least one second feedback computation for the at least one second, rank based on the performed measurements. The processor 402 may further in some embodiments be adapted to include applying the second relation between, assumed transmitted energy for data and transmitted energy for the one or more reference signals in performing the at least one second feedback computation for the at least one second rank, whereas, in other embodiments the at least one second feedback computation may be performed assuming conditions that are not dependent on rank. The second relation reflects an assumption on transmitted energy for data if data would be received that had been transmitted using one of the at least one second rank relative to the transmitted energy for the one or more reference signals, for example in form of a ratio between the assumed transmitted energy for data for the at least one second rank and transmitted energy for the one or more reference signals.

Applying the second relation between assumed transmitted energy for data and transmitted energy for the one or more reference signals in the at least one second feedback computation may in some embodiments further adjust, in addition to the adjustment obtained by applying the first relation in the first feedback computations, how often the first rank becomes the selected rank. In an example embodiment, when the first rank is a lower rank than the at least one second rank, applying the second relation between assumed transmitted energy for data and transmitted energy for the one or more reference signals in the at least one second feedback computation may further increase, in addition to the increase obtained by applying the first relation in the first feedback computations, the likelihood that the first rank becomes the selected rank.

The processor 402 is further adapted to select a rank out of the first rank and the at least one second rank based on the performed first and at least one second feedback computations, and to indicate the selected rank in a feedback report to the sending node 200. The selected rank may for example be indicated by a Rank Indicator (RI) in a Channel State Information (CSI) feedback report.

With reference to the further embodiments of the method illustrated in FIG. 3b and described in detail above, the transceiver 414 and the processor 402 of the receiving node 270 implemented as the node 400 depicted in FIG. 4 may further be adapted as described below.

As mentioned above, these further embodiments teach that the first relation between assumed transmitted energy for data and transmitted energy for the one or more reference signals is reflected by a first scaling parameter applicable for or specific to the that rank and that the second relation between assumed transmitted enemy for data and transmitted energy for the one or more reference signals is reflected by a second scaling parameter applicable for or specific to the at least one second rank. In some embodiments, the first and second scaling parameters may be comprised in a set of Power Measurement Offset (PMO) parameters. Additionally or alternatively, the first and second scaling parameters may be separate from Power Measurement Offset parameters used for precoder and/or Channel Quality Indicator determination.

In accordance with the further embodiments of the method presented with reference to FIG. 3b, the transceiver 414 is adapted to receive one or more reference signals from the sending node 200 and to transmit or send a feedback report to the sending node 200. The transceiver 414 is further adapted to transmit a selected rank or an indication of the selected rank to the sending node in the feedback report.

The transceiver 414 may further be adapted in some embodiments to receive first and, second relations between assumed transmitted energy for data and transmitted energy for the one or more reference signals from the sending node 200, for example in one or more configuration messages or control messages. The first scaling parameter may then be determined, e g by the processor 402, from the first relation between assumed transmitted energy for data and transmitted energy for the one or more reference signals and the second scaling parameter may then be determined, e g by the processor 402, from the second relation between assumed transmitted energy for data and transmitted energy for the one or more reference signals. Alternatively, the first and second scaling parameters may be received from the sending node 200, for example in one or more configuration messages or control messages. Alternatively or additionally, the first and second scaling parameters may be pre-configured in the receiving node 270, 400, for example in memory 404.

In accordance with the further embodiments of the method presented with reference to FIG. 3b, the processor 402 is adapted to perform measurements on the one or more reference signals and to estimate a measurement channel property based on the performed measurements. The measurement channel property may in some embodiments be a measurement channel estimate.

The processor 402 is further adapted to perform a first and at least one second feedback computation based on the performed measurements for an assumed reception of a hypothetical data transmission of an assumed rank. The first rank and the at least one second rank are used as the assumed rank in the first and at least one second feedback computation respectively. The processor 402 is further adapted to modify the estimated measurement channel property by a scaling factor that is dependent on the assumed rank so that a relative candidate strength of the assumed rank is modified. The scaling factor is determined based on a set of scaling parameters that comprises the first and second scaling parameters. The scaling factor is dependent on the assumed rank in that the first scaling parameter applies when using said first rank as the assumed rank and the second scaling parameter applies when using the at least one second rank as the assumed rank. Thus, in a first feedback computation performed for the first rank, i e where the first rank is assumed, the measurement channel property is modified by the first scaling parameter that is specific to the first rank in that it has been specifically or individually configured for the first rank. In at least one second feedback computation performed for the at least one second rank, i e where the at least one second rank is assumed, the measurement channel properly may additionally be modified by the second scaling parameter that is specific to the at least one second rank in that it has been specifically or individually configured for the at least one second rank. The processor 402 is adapted to perform the first and second feedback computations to determine relative candidate strengths of the first rank and the at least one second rank. By applying the first scaling parameter in the first feedback computation and/or the second scaling parameter in the at least one second feedback computation, the relative candidate strengths of the first and at least one second rank may be modified, i e the strengths as a candidate for use in transmissions to the receiving node 270 of the first and at least one second rank are modified relative to each other. The relative candidate strength reflects a likelihood that the assumed rank is selected for being indicated or reported to the sending node for use in transmissions to said receiving node.

The processor 402 is further adapted to, based on the performed feedback computations, determine a selected rank out of the first rank and the at least one second rank that is to be indicated or reported to the sending node. The processor 402 may be adapted to select a rank out of the first rank and the at least one second rank based on the relative candidate strengths determined in the performed first and at least one second feedback computations.

The processor 402 may further be adapted to modify the scaling factor by an hysteresis value so that, in a situation when the first rank is a current rank that has been indicated or reported to the sending node in a latest feedback report, the relative candidate strength of the assumed rank is higher when the first rank is used as the assumed rank as compared to the relative candidate strength of the assumed rank when the first rank is used as the assumed rank in a situation when the first rank is not the current rank. In other words, the processor 402 may be further adapted to modify the first scaling parameter by a hysteresis value when the first rank is indicated to the sending node 200 in a latest feedback report, so that the relative candidate strength of the first rank becomes higher when the first rank was indicated to the sending node 200 in the latest feedback report, as compared to the relative candidate strength of the first rank when the first rank was not indicated to the sending node 200 in the latest feedback report.

To perform the method steps for enabling a receiving node 270 to assist the sending node 200 in performing transmission rank adaptation, i e adaptations of a rank for transmissions to the receiving node 270 over a multiple-input-multiple-output (MIMO) channel, the sending node 200 may be implemented as a node 400 depicted in FIG. 4. As mentioned above, the rank used for the transmissions may be one out of a set of different ranks. The set of different ranks comprises a first rank and at least one second rank. The transmissions may for example be transmissions of data.

The sending node 200, 400 comprises a processor 402 upon which an Operating System 408 and an application 410 may run. The processor 402 is adapted to control an interface unit 412 that comprises a transceiver 414.

The transceiver 414 is adapted to transmit one or more reference signals to the receiving node 270. The transceiver 414 is further adapted to signal to the receiving node 270 a first relation between assumed transmitted energy for data and transmitted energy for the one or more reference signals, wherein the first relation is specific to the first rank, and a second relation between assumed transmitted energy for data and transmitted energy for the one or more reference signals, wherein the second relation is specific to the at least one second rank. The first relation is specific to the first rank in that it has been specifically or individually configured for the first rank. The second relation is specific to the at least one second rank in that it has been specifically or individually configured for the at least one second rank. This also means that the first relation has not been configured for the at least one second rank.

The first relation between assumed transmitted energy for data and transmitted energy for the one or more reference signals may be reflected by a first Power Measurement Offset parameter applicable for or specific to the first rank. The second relation between assumed transmitted energy for data and transmitted energy for the one or more reference signals may be reflected by a second Power Measurement Offset parameter applicable for or specific to the at least one second rank. In some embodiments, the first and second relation between assumed transmitted energy for data and transmitted energy for the one or more reference signals are equivalent to the first and second Power Measurement Offset parameters. The first and second Power Measurement Offset parameters, or first and second relations between assumed transmitted energy for data and transmitted energy for the one or more reference signals, may further in some embodiments be separate from Power Measurement Offset parameters used for precoder and/or channel Quality Indicator determination.

The transceiver 414 is further adapted to receive a feedback report from the receiving node 270 indicating one of said first and said at least one second rank as a selected rank. The transceiver 414 may then be adapted to use the selected rank for transmissions to the receiving node 270. The transceiver 414 may however in other circumstances be adapted to use another rank for transmissions to the receiving node 270.

The first relation between assumed transmitted energy for data and transmitted energy for the one or more reference signals may be set so that the likelihood that the first rank is reported as the selected rank by the receiving node 270 is adjusted. For example, the first relation between assumed transmitted energy for data and transmitted energy for the one or more reference signals may be set so that the likelihood that the first rank is reported as the selected rank by the receiving node 270 is increased when the first rank is a lower rank than the at least one second rank. Similarly, the second relation between assumed transmitted energy for data and transmitted energy for the one or more reference signals may be set so that the likelihood that one of the at least one second rank is reported as the selected rank by the receiving node 270 is adjusted.

The receiving node or UE 270 and the sending node or eNodeB 200 may, for example, be implemented using various components, both hardware and software. For example, as shown generally in FIG. 4, such a receiving node or sending node 400 may include a processor 402, or multiple processor cores, memory 404, one or more secondary storage devices 406, e.g., external storage device(s), an operating system 408 running on the processor 402 and using the memory 404, as well as, a corresponding application 410. An interface unit 412 may be provided to facilitate communications between the node 400 and the rest of the network or may be integrated into the processor 402. For example, interface unit 412 can include a transceiver 414 capable of communicating wirelessly over an air interface, e.g., as specified by LTE, including hardware and software capable of performing the necessary modulating, coding, filtering and the like, as well as demodulating and decoding to process such signals.

The present mechanism for transmitting and receiving control information may be implemented through one or more processors, such as the processor 402 in the node 400 depicted in FIG. 4, together with computer program code for performing the functions of the present solutions for transmitting and receiving control information respectively. The program code mentioned above may also be provided as a computer program product, for instance in the form of a data carrier carrying computer program code for performing the present solutions when being loaded into the node 400. One such carrier may be in the form of a CD ROM disc. It is however feasible with other data carriers such as a memory stick. The computer program code can furthermore be provided as pure program code on a server and downloaded to the node 400 remotely.

The introduction of several configurable PMO parameters or scaling factors that may be different for different ranks has the advantage of offering a way for ensuring that the reported rank is increased only when it is significantly beneficial from a link perspective to do so. This avoids the undesirable behavior that the receiving node or UE is reporting a higher rank because of a seemingly marginal gain on the link which turns into a loss because of the resulting higher ranks transmission's more detrimental interference to other cells. It also improves dynamic switching between SU-MIMO and MU-MIMO since the receiving node or UE, with appropriately configured PMO values or scaling factors, is less likely to report a higher rank even though a lower more MU-MIMO, friendly rank would turn out to be better.

Stabilized rank adaptation by means of hysteresis in the rank selection help outer-loops algorithms for link adaptation adjustment, such as ACK/NACK based CQI adjustment, to converge leading to less link adaptation errors and ultimately better performance.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention, which is defined by the appended claims.

The invention claimed is:

1. A method in a receiving node for assisting a sending node in performing adaptations of a rank for transmissions being received by the receiving node over a multiple-input-multiple-output (MIMO) channel, the rank being one out of a set of different ranks, the set of different ranks comprising a first rank and at least one second rank, the method comprising:
performing measurements on one or more reference signals received from the sending node;
performing a first feedback computation for the first rank, based on the performed measurements, by applying a first relation between assumed transmitted energy for data and transmitted energy for the one or more reference signals, wherein the first relation is specific to the first rank and wherein a second relation between assumed transmitted energy for data and transmitted energy for the one or more reference signals is specific to the at least one second rank;
performing at least one second feedback computation for the at least one second rank based on the performed measurements;
selecting a rank out of the first rank and the at least one second rank based on the performed first and at least one second feedback computations; and
indicating the selected rank in a feedback report to the sending node.

2. The method of claim 1, wherein performing the at least one second feedback computation for the at least one second rank includes applying the second relation between assumed transmitted energy for data and transmitted energy for the one or more reference signals.

3. The method of claim 1, wherein the first and second relations between assumed transmitted energy for data and transmitted energy for the one or more reference signals are received from the sending node.

4. The method of claim 1, wherein the first and second relations between assumed transmitted energy for data and transmitted energy for the one or more reference signals are pre-configured in the receiving node.

5. The method of claim 1, wherein the first relation between assumed transmitted energy for data and transmitted energy for the one or more reference signals is reflected by a first Power Measurement Offset parameter applicable for the first rank and wherein the second relation between assumed transmitted energy for data and transmitted energy for the one or more reference signals is reflected by a second Power Measurement Offset parameter applicable for the at least one second rank.

6. The method of claim 5, wherein the first and second Power Measurement Offset parameters are separate from Power Measurement Offset parameters used for precoder or Channel Quality Indicator determination.

7. The method of claim 1, wherein applying the first relation between assumed transmitted energy for data and transmitted energy for the one or more reference signals in the first feedback computation adjusts how often the first rank becomes the selected rank.

8. The method of claim 1, wherein applying the first relation between assumed transmitted energy for data and transmitted energy for the one or more reference signals in the first feedback computation increases a likelihood that the first rank becomes the selected rank when the first rank is a lower rank than the at least one second rank.

9. The method of claim 1, wherein the first relation between assumed transmitted energy for data and transmitted energy for the one or more reference signals is reflected by a first scaling parameter applicable for the first rank and wherein the second relation between assumed transmitted energy for data and transmitted energy for the one or more reference signals is reflected by a second scaling parameter applicable for the at least one second rank.

10. The method of claim 9, further comprising estimating a measurement channel property based on the performed measurements; and wherein the measurement channel property is modified by the first scaling parameter in the first feedback computation.

11. The method of claim 10, wherein the measurement channel property is modified by the second scaling parameter in the at least one second feedback computation.

12. The method of claim 9, wherein
the first feedback computation is performed to determine a relative candidate strength of the first rank;
the at least one second feedback computation is performed to determine a relative candidate strength of the at least one second rank;
the first and second scaling parameters are applied in said first and second feedback computations to modify the relative candidate strengths of the first and at least one second rank; and
the step of selecting a rank out of the first rank and the at least one second rank is performed based on the relative candidate strengths determined in the performed first and at least one second feedback computations.

13. The method of claim 9, wherein the first scaling parameter is modified by a hysteresis value when the first rank was indicated to the sending node in a latest feedback report, so that the relative candidate strength of the first rank is higher when the first rank was indicated to the sending node in the latest feedback report, as compared to the relative candidate strength of the first rank when the first rank was not indicated to the sending node in the latest feedback report.

14. The method of claim 9, wherein the first and second scaling parameters are comprised in a set of Power Measurement Offset (PMO) parameters.

15. The method of claim 9, wherein the first and second scaling parameters are separate from Power Measurement Offset parameters used for precoder or Channel Quality Indicator determination.

16. The method of claim 9, wherein the first and second scaling parameters are received from the sending node.

17. The method of claim 9, wherein the first and second scaling parameters are pre-configured in the receiving node.

18. A method in a sending node for enabling a receiving node to assist the sending node in performing adaptations of a rank for transmissions to the receiving node over a multiple-input-multiple-output (MIMO) channel, the rank being one out of a set of different ranks, the set of different ranks comprising a first rank and at least one second rank, the method comprising:
transmitting one or more reference signals to the receiving node;
signalling to the receiving node a first relation between assumed transmitted energy for data and transmitted energy for the one or more reference signals, wherein the first relation is specific to the first rank and a second relation between assumed transmitted energy for data and transmitted energy for the one or more reference signals, wherein the second relation is specific to the at least one second rank; and
receiving a feedback report from the receiving node indicating one of said first and said at least one second ranks as a selected rank.

19. The method of claim 18, wherein the sending node uses the selected rank for transmissions to the receiving node.

20. The method of claim 18, wherein the first relation between assumed transmitted energy for data and transmitted energy for the one or more reference signals is reflected by a first Power Measurement Offset parameter applicable for the first rank and wherein the second relation between assumed transmitted energy for data and transmitted energy for the one or more reference signals is reflected by a second Power Measurement Offset parameter applicable for the at least one second rank.

21. The method of claim 20, wherein the first and second Power Measurement Offset parameters are separate from Power Measurement Offset parameters used for precoder or Channel Quality Indicator determination.

22. The method of claim 18, wherein the first relation between assumed transmitted energy for data and transmitted energy for the one or more reference signals is set so that a likelihood that the first rank is reported as the selected rank by the receiving node is adjusted.

23. The method of claim 18, wherein the first relation between assumed transmitted energy for data and transmitted energy for the one or more reference signals is set so that a likelihood that the first rank is reported as the selected rank by the receiving node is increased when the first rank is a lower rank than the at least one second rank.

24. A receiving node for assisting a sending node in performing adaptations of a rank for transmissions being received by the receiving node over a multiple-input-multiple-output (MIMO) channel, the rank being one out of a set of different ranks, the set of different ranks comprising a first rank and at least one second rank, the receiving node comprising:
a transceiver adapted to receive one or more reference signals from the sending node and to transmit a feedback report to the sending node;
a processor adapted to:
perform measurements on the one or more reference signals;
perform a first feedback computation for the first rank, based on the performed measurements, by applying a first relation between assumed transmitted energy for data and transmitted energy for the one or more reference signals, wherein the first relation is specific to the first rank and wherein a second relation between assumed transmitted energy for data and transmitted energy for the one or more reference signals is specific to the at least one second rank;
perform at least one second feedback computation for the at least one second rank based on the performed measurements;
select a rank out of the first rank and the at least one second rank based on the performed first and at least one second feedback computations; and
indicate the selected rank in a feedback report to the sending node.

25. The receiving node of claim 24, wherein the processor is further adapted to apply the second relation between assumed transmitted energy for data and transmitted energy for the one or more reference signals in performing the at least one second feedback computation for the at least one second rank.

26. The receiving node of claim 24, wherein the transceiver is further adapted to receive the first and second relations between assumed transmitted energy for data and transmitted energy for the one or more reference signals from the sending node.

27. The receiving node of claim 24, wherein the first and second relations between assumed transmitted energy for data and transmitted energy for the one or more reference signals are pre-configured in the receiving node.

28. The receiving node of claim 24, wherein the first relation between assumed transmitted energy for data and transmitted energy for the one or more reference signals is reflected by a first Power Measurement Offset parameter applicable for the first rank and wherein the second relation between assumed transmitted energy for data and transmitted energy for the one or more reference signals is reflected by a second Power Measurement Offset parameter applicable for the at least one second rank.

29. The receiving node of claim 28, wherein the first and second Power Measurement Offset parameters are separate from Power Measurement Offset parameters used for precoder or Channel Quality Indicator determination.

30. The receiving node of claim 24, wherein applying the first relation between assumed transmitted energy for data and transmitted energy for the one or more reference signals in the first feedback computation adjusts how often the first rank becomes the selected rank.

31. The receiving node of claim 24, wherein applying the first relation between assumed transmitted energy for data and transmitted energy for the one or more reference signals in the first feedback computation increases a likelihood that the first rank becomes the selected rank when the first rank is a lower rank than the at least one second rank.

32. The receiving node of claim 24, wherein the first relation between assumed transmitted energy for data and transmitted energy for the one or more reference signals is reflected by a first scaling parameter applicable for the first rank and wherein the second relation between assumed transmitted energy for data and transmitted energy for the one or more reference signals is reflected by a second scaling parameter applicable for the at least one second rank.

33. The receiving node of claim 32, wherein the processor is further adapted to estimate a measurement channel property based on the performed measurements, and wherein the measurement channel property is modified by the first scaling parameter in the first feedback computation.

34. The receiving node of claim 33, wherein the measurement channel property is modified by the second scaling parameter in the at least one second feedback computation.

35. The receiving node of claim 32, wherein the processor is further adapted to
perform the first feedback computation to determine a relative candidate strength of the first rank;
perform the at least one second feedback computation to determine a relative candidate strength of the at least one second rank;
apply the first and second scaling parameters in said first and second feedback computations to modify the relative candidate strengths of the first and at least one second rank; and
select a rank out of the first rank and the at least one second rank based on the relative candidate strengths determined in the performed first and at least one second feedback computations.

36. The receiving node of claim 32, wherein the processor is further adapted to modify the first scaling parameter by a hysteresis value when the first rank was indicated to the sending node in a latest feedback report, so that the relative candidate strength of the first rank is higher when the first rank was indicated to the sending node in the latest feedback report, as compared to the relative candidate strength of the first rank when the first rank was not indicated to the sending node in the latest feedback report.

37. The receiving node of claim 32, wherein the first and second scaling parameters are comprised in a set of Power Measurement Offset (PMO) parameters.

38. The receiving node of claim 32, wherein the first and second scaling parameters are separate from Power Measurement Offset parameters used for precoder or Channel Quality Indicator determination.

39. The receiving node of claim 32, wherein the transceiver is further adapted to receive the first and second scaling parameters from the sending node.

40. The receiving node of claim 32, wherein the first and second scaling parameters are pre-configured in the receiving node.

41. A sending node for enabling a receiving node to assist the sending node in performing adaptations of a rank for transmissions to the receiving node over a multiple-input-multiple-output (MIMO) channel, the rank being one out of a set of different ranks, the set of different ranks comprising a first rank and at least one second rank, the sending node comprising a transceiver adapted to:
transmit one or more reference signals to the receiving node;
signal to the receiving node a first relation between assumed transmitted energy for data and transmitted energy for the one or more reference signals, wherein the first relation is specific to the first rank and a second relation between assumed transmitted energy for data and transmitted energy for the one or more reference signals, wherein the second relation is specific to the at least one second rank; and
receive a feedback report from the receiving node indicating one of said first and said at least one second ranks as a selected rank.

42. The sending node of claim 41, wherein the transceiver is further adapted to use the selected rank for transmissions to the receiving node.

43. The sending node of claim 41, wherein the first relation between assumed transmitted energy for data and transmitted energy for the one or more reference signals is reflected by a first Power Measurement Offset parameter applicable for the first rank and wherein the second relation between assumed transmitted energy for data and transmitted energy for the one or more reference signals is reflected by a second Power Measurement Offset parameter applicable for the at least one second rank.

44. The sending node of claim 43, wherein the first and second Power Measurement Offset parameters are separate from Power Measurement Offset parameters used for precoder or Channel Quality Indicator determination.

45. The sending node of claim 41, wherein the first relation between assumed transmitted energy for data and transmitted energy for the one or more reference signals is set so that a likelihood that the first rank is reported as the selected rank by the receiving node is adjusted.

46. The method of claim 41, wherein the first relation between assumed transmitted energy for data and transmitted energy for the one or more reference signals is set so that a likelihood that the first rank is reported as the selected rank by the receiving node is increased when the first rank is a lower rank than the at least one second rank.

* * * * *